United States Patent
Wilson et al.

(10) Patent No.: US 7,229,115 B2
(45) Date of Patent: Jun. 12, 2007

(54) VEHICLE CARGO ENCLOSURE SIDE POCKET

(75) Inventors: Matthew D. Wilson, Augusta, GA (US); Bradley J. Hanson, North Augusta, SC (US); Anthony J. Sanville, Evans, GA (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 11/147,030

(22) Filed: Jun. 7, 2005

(65) Prior Publication Data
US 2006/0273626 A1   Dec. 7, 2006

(51) Int. Cl.
*B62D 33/02*   (2006.01)
(52) U.S. Cl. .................. 296/39.1; 296/39.2; 296/24.4; 296/43; 419/129
(58) Field of Classification Search .............. 296/39.1, 296/39.2, 24.4, 43, 181.4; 410/129
See application file for complete search history.

(56) References Cited

U.S. PATENT DOCUMENTS

| | | | | | |
|---|---|---|---|---|---|
| 4,453,761 | A | * | 6/1984 | Felburn | 296/43 |
| 5,167,433 | A | * | 12/1992 | Ryan | 296/37.1 |
| 5,240,301 | A | * | 8/1993 | Arnold | 296/39.2 |
| 5,415,506 | A | * | 5/1995 | Payne | 410/129 |
| 5,720,507 | A | * | 2/1998 | Emery | 296/39.2 |
| 5,788,309 | A | * | 8/1998 | Emery et al. | 296/39.1 |

* cited by examiner

*Primary Examiner*—Dennis H. Pedder
(74) *Attorney, Agent, or Firm*—Harness, Dickey & Pierce, P.L.C.

(57) ABSTRACT

A cargo enclosure for a vehicle includes a side panel having at least one pocket is formed therein. The pocket has a back wall, a pair of opposing side walls and a front wall having an aperture therein. A bottom surface of the pocket is canted downwardly from the back wall toward the aperture in the front wall such that any debris or other material that may infiltrate the pocket will readily slide down the canted bottom surface, through the aperture and onto a bottom surface of the cargo enclosure.

22 Claims, 4 Drawing Sheets

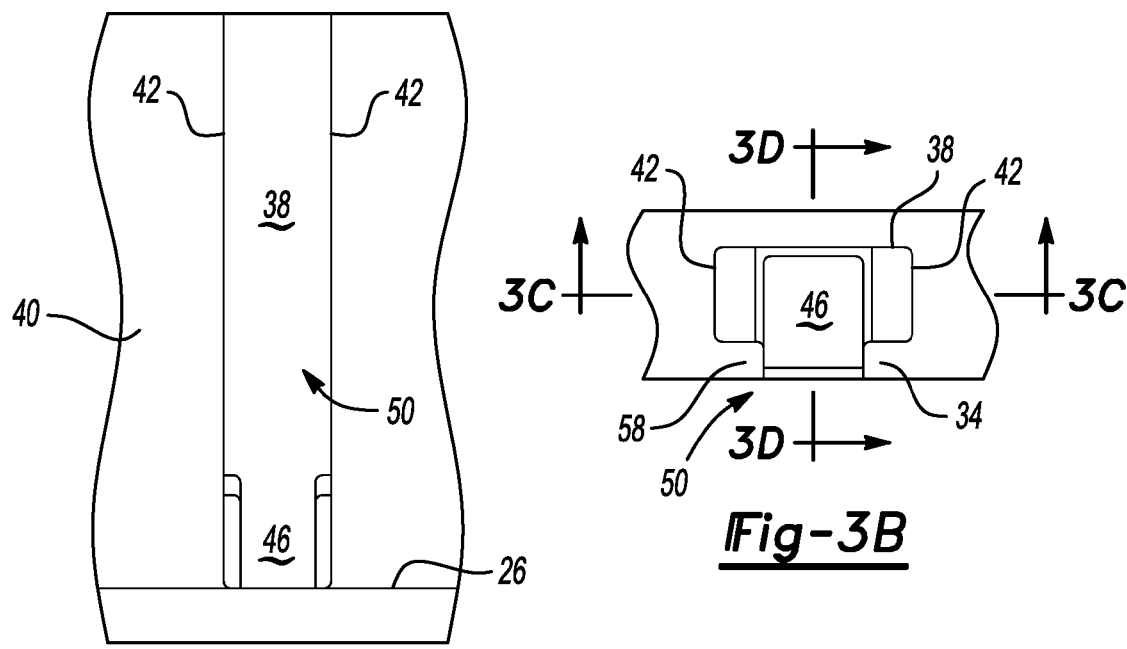
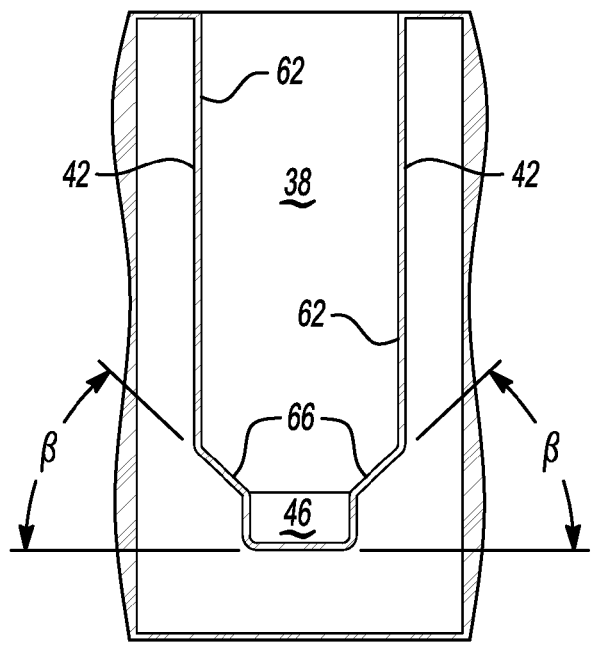
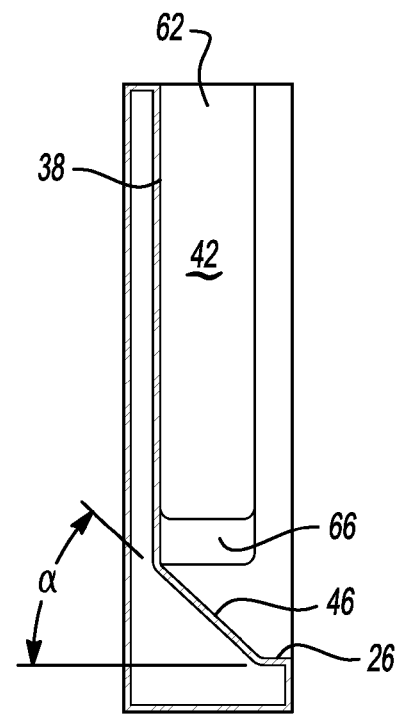
Fig-3A
Fig-3B
Fig-3C
Fig-3D

VEHICLE CARGO ENCLOSURE SIDE POCKET

FIELD OF INVENTION

The invention relates generally to vehicle cargo enclosures, such as cargo beds and bed liners. More particularly the invention relates to cargo enclosure divider and side rail pockets formed within a side panel of the cargo enclosure.

BACKGROUND OF THE INVENTION

Typical vehicle utility beds include a steel welded bed with a plastic liner disposed within the steel bed. Alternatively, the bed can be a one-piece plastic molded utility bed. The bottoms of such plastic beds and liners generally have a plurality of ridges extending longitudinally approximately the length of the plastic bed or liner from the tail gate of the bed toward the front of the bed. Since the ridges extend longitudinally, i.e. lengthwise, debris or other material deposited in the bed or liner can be easily cleaned or removed from the bottom of the bed or liner using a broom, water hose or air hose.

Most contemporary beds and liners also include pockets formed with side panels of the bed or liner for retaining bed dividers and/or side rail stakes. Such divider/side rail pockets tend to gather, accumulate and retain small debris or other materials. Small debris and/or other materials that have collected in the pockets are difficult to remove from the pockets and can interfere with using the pocket to retain a bed divider and/or side rail stake. Often a small brush or other suitable tool is required to remove the collected debris or other material.

Therefore, it would be desirable to provide a vehicle cargo enclosure, such as a cargo bed or bed liner, that incorporates divider and/or side rail stake pockets that resist collecting and accumulating debris or other materials.

BRIEF SUMMARY OF THE INVENTION

In one embodiment of the present invention, a vehicle cargo enclosure is provided. The cargo enclosure includes a side panel having at least one pocket formed within or connected thereto. The pocket has a back wall and a pair of opposing side walls that include a substantially vertical upper portion and a bottom portion that is canted downwardly from the respective side wall toward the opposing side wall. The pocket additionally includes a front wall that includes an aperture, e.g. a slot, such that the back wall, side walls and front wall form a substantially C-shaped elongated recess within the cargo enclosure side panel. A bottom surface of the pocket adjoins each of the back walls, the side walls and the first and second front partitions. The bottom surface is canted downwardly from the back wall toward the aperture in the front wall such that any small debris or material that may infiltrate the pocket will readily slide down the canted bottom surface, through the aperture and onto a bottom surface of the cargo enclosure. Therefore, the debris or material does not accumulate within the pocket, but instead falls onto the cargo enclosure bottom where it can be easily and readily removed.

In one implementation, the aperture within the front wall is adapted to retain a cargo enclosure divider such as 2"×6" board or any other suitable structure that can be utilized to divide the cargo enclosure into a plurality of sections, areas, portions or compartments. In another implementation, the substantially C-shaped recess is adapted to retain a cargo enclosure side rail stake and simultaneously or separately also retain a cargo enclosure divider within the aperture within the front wall.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and accompanying drawings, wherein;

FIG. 3A is a front view of the retaining pocket shown in FIG. 2A;

FIG. 3B is top view of the retaining pocket shown in FIG. 2C;

FIG. 3C is cross-sectional front view of the retaining pocket shown in FIG. 3B along line B—B;

FIG. 3D is cross-sectional side view of the retaining pocket shown in FIG. 3B along line A—A;

Corresponding reference numerals indicate corresponding parts throughout the several views of drawings.

DETAILED DESCRIPTION OF THE INVENTION

The following description of the preferred embodiment(s) is merely exemplary in nature and is in no way intended to limit the invention, its application, or uses.

Figure 1:
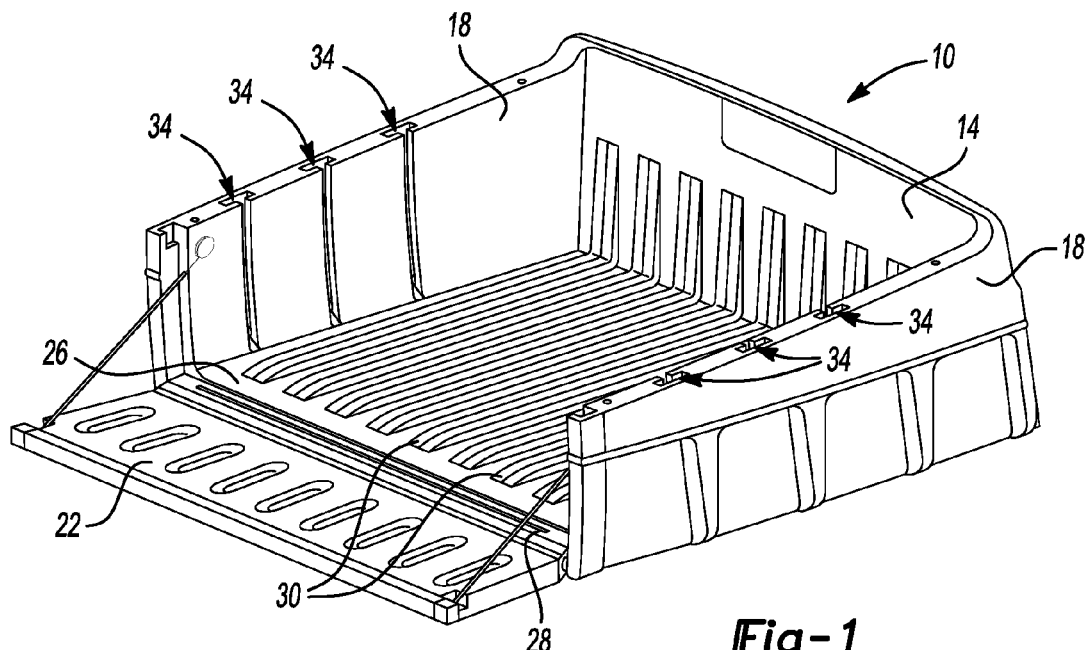
FIG. 1 is an isometric view of a vehicle cargo enclosure, in accordance with the present invention.

FIG. 1 is an isometric view of vehicle cargo enclosure 10 in accordance with the present invention. The cargo enclosure 10 includes any enclosure or structure suitable for holding and/or hauling any type of cargo, e.g. sand, dirt, gravel and any other material, apparatus, equipment, machinery or device, such as a utility bed or a utility bed liner. The cargo enclosure 10 includes a front panel 14, a pair of side panels 18, a tail gate 22 and a bottom surface 26. The tail gate 22 pivotally connects to the cargo enclosure bottom surface 26 along a back edge 28 of the cargo enclosure bottom surface 26. The front panel 14 and the side panels adjoin the bottom surface 26. Although the front panel 14, side panels 18 and bottom surface 26 are described herein as adjoining, it should be understood that the front panel 14, side panels 18 and bottom surface 26 can be molded as a unitary piece. Alternatively, the front panel 14, side panels 18 and bottom surface 26 can be fabricated separately and then connected to form three sides and a bottom of the cargo enclosure 10. The bottom surface 26 includes a plurality of raised ridges 30 that extend longitudinally from the back edge 28 to an opposing end of the cargo enclosure bottom surface 26 that adjoins the front panel 14. Alternatively, the cargo enclosure bottom surface 26 could have a substantially flat form that is textured or smooth.

The side panels 18 each include at least one pocket 34. In one implementation, the pockets 34 are adapted to retain a cargo enclosure divider, such 2"×6" board or any other suitable structure that can be utilized to divide the cargo enclosure into a plurality of sections, areas, portions or compartments. In another implementation, the pockets 34 are adapted to retain a cargo enclosure side rail stake. The side rail stake should be understood to mean a substantially vertical structure or post adapted to support other structures, such as side rails, side walls or utility racks. In yet another implementation, the pockets 34 are adapted to simultaneously retain a cargo enclosure divider and a side rail stake. The pockets 34 can be formed, e.g. molded, as an integral part of the side panels 18 or formed independently and then inserted within or connected to the side panels 18.

Figure 2A:
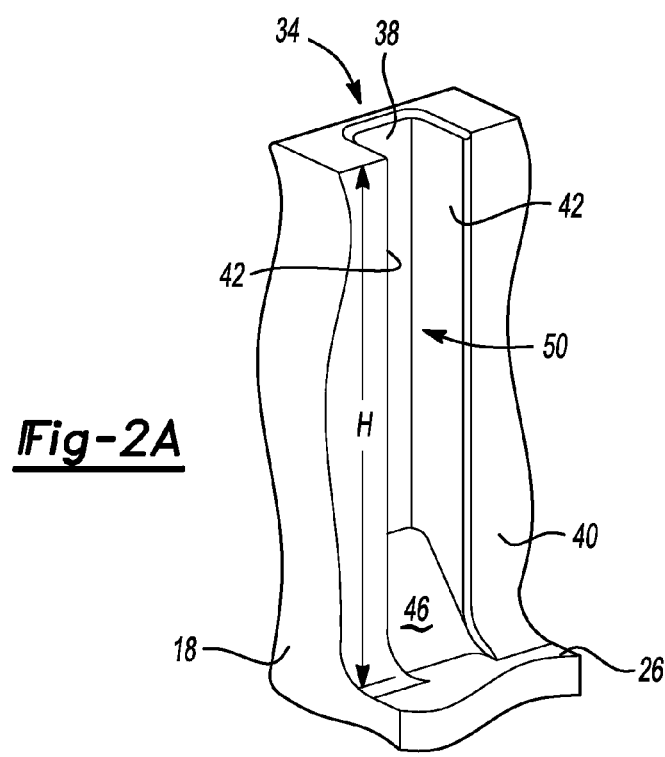
FIG. 2A is a sectional view of a portion of the cargo enclosure shown in FIG. 1 that includes a cargo enclosure divider retaining pocket, in accordance with the present invention.
Figure 2B:
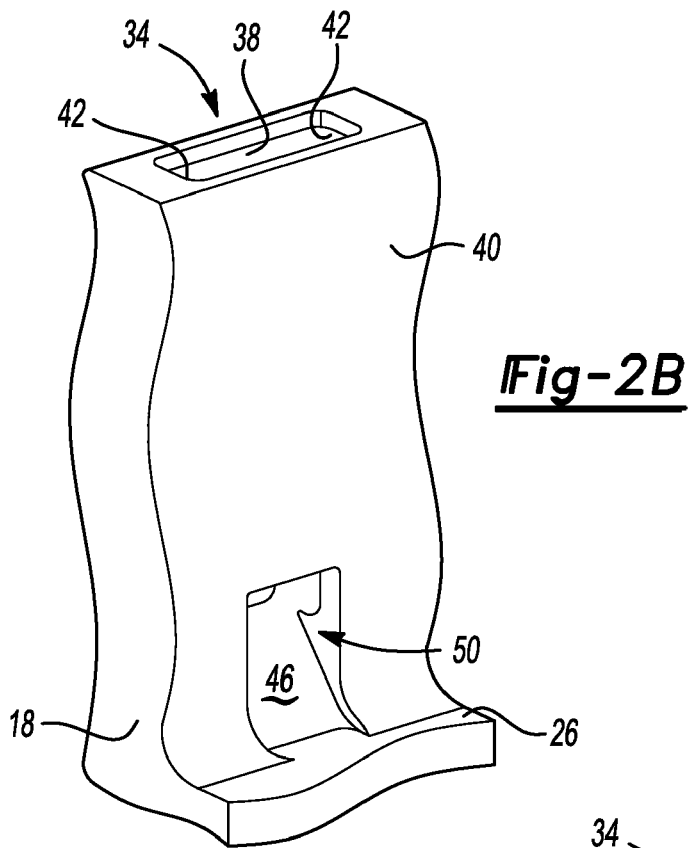
FIG. 2B is a sectional view of a portion of the cargo enclosure shown in FIG. 1 that includes a side rail stake retaining pocket, in accordance with the present invention.
Figure 2C:
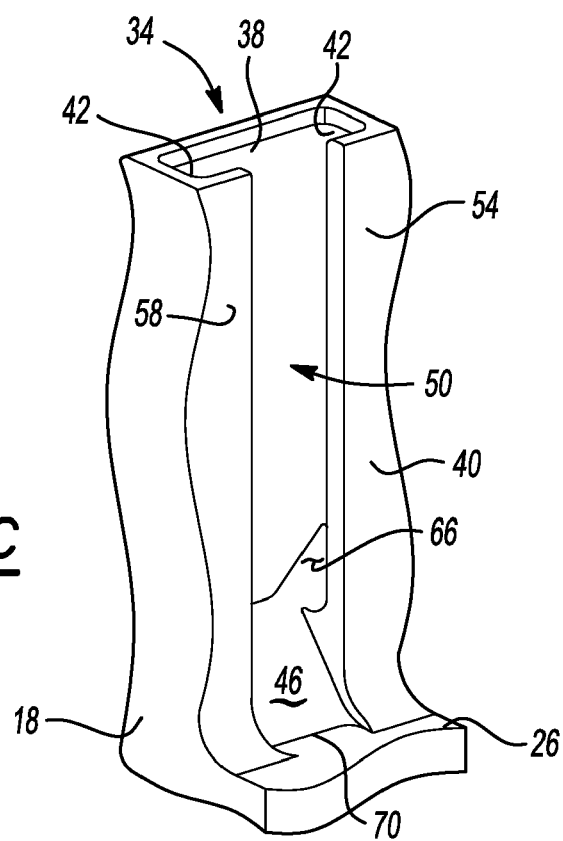
FIG. 2C is a sectional view of a portion of the cargo enclosure shown in FIG. 1 that includes a combined cargo enclosure divider and side rail stake retaining pocket, in accordance with the present invention.

Referring to FIGS. 2A through 2C, each pocket 34 includes a back wall 38 and a front wall 40 that adjoin a pair of opposing side walls 42. The back wall 38, front wall 40 and side walls 42 adjoin a canted pocket bottom surface 46. Although the back wall 38, front wall 40, side walls 42 and pocket bottom surface 46 are described herein as adjoining, it should be understood that each pocket 34 is preferably a molded pocket that is either integrally formed with or connected to the cargo enclosure side panels 18, as described above. Thus, the back wall 38, the front wall 40, the side walls 42 and the bottom surface 46 of each pocket 34 forms a continuous interior surface of the respective pocket 34. Alternatively, any one, or all, of the back wall 38, front wall 40, side walls 42 and bottom surface 46 can be independently fabricated and assembled to form the respective pocket 34.

The front wall 40 of each pocket 34 includes an aperture 50 that allows any small debris or other material, e.g. sand, dirt or gravel, that may infiltrate the pocket 34 to readily slide down the canted bottom surface 46, through the aperture and onto the cargo enclosure bottom surface 26. As illustrated in FIGS. 2A and 2C, in various embodiments, the aperture 50 forms a slot, or elongated opening, extending a height H of the front wall 40 that is adapted to retain a cargo enclosure divider. Thus, the aperture 50, in combination with the back wall 38, the front wall 40 and the side walls 42 forms a substantially C-shaped recess that comprises the pocket 34. When the pockets 34 are adapted to retain a cargo enclosure divider and/or a side rail stake, as illustrated in FIG. 2C, the aperture 50 sub-divides the front wall 40 into a first partition 54 adjoining one of the side walls 42 and a second partition 58 adjoining the opposing side wall 42.

Referring now to FIGS. 3A through 3D, the pocket bottom surface 46 is canted downwardly from the back wall 38 toward the aperture 50 at a predetermined angle α, as most clearly shown in FIG. 3D. The angle α can be an angle suitable to allow small debris or other material, e.g. sand, dirt or gravel, that infiltrates the pocket 34 to readily slide down the canted bottom surface 46 generally due to the force of gravity. To more thoroughly and completely remove any debris or other material from the pocket 34, forced water, e.g. water from a hose or a power washer, can be sprayed into the pocket 34. Additionally, other forces such as air or sweeping may be applied to thoroughly and completely remove any debris or other material from the pocket 34. But, generally, the angle α is substantially steep enough that most, or substantially all, the debris or other material will slide down the canted bottom surface 46 onto the cargo enclosure bottom surface 26 as a result of gravity. For example, the pocket bottom surface 46 can be canted at an angle approximately between 30° and 75° relative to the cargo enclosure bottom surface 46. More preferably, the pocket bottom surface 46 is canted at an angle approximately between 45° and 60° relative to the cargo enclosure bottom surface 46.

As best illustrated in FIGS. 3C and 3D, when the pocket 34 is adapted to retain a cargo enclosure divider and/or a side rail stake, each of the side walls 42 include a substantially vertical upper portion 62 and a canted bottom portion 66. The bottom portion 66 is canted downwardly from the respective side wall upper portion 62 toward the opposing side wall 42 at a predetermined angle β. The angle β can be an angle suitable to allow debris or other material that infiltrates the pocket 34 to readily slide down the side wall canted bottom portions 66, onto the canted pocket bottom surface 46 and then onto the cargo enclosure bottom surface 26 generally due to the force of gravity. Other forces such as air, water or sweeping may be applied to thoroughly and completely remove any debris or other material from the pocket 34. But, generally, the angle β is substantially steep enough that the most, or substantially all, the debris or other material will slide down the canted side wall bottom portions 66 onto canted bottom surface 46 and onto the cargo enclosure bottom surface 26 as a result of gravity. For example, the side wall bottom portions can be canted at an angle approximately between 30° and 75° relative to the cargo enclosure bottom surface 46. More preferably, the side wall bottom portions are canted at an angle approximately between 45° and 60° relative to the cargo enclosure bottom surface 46.

Referring again to FIG. 2C, in one embodiment, a front edge 70 of the canted pocket bottom surface 46 adjoins the cargo enclosure bottom surface 26 within the aperture 50 between the first and second front partitions 54 and 58.

Figure 4:
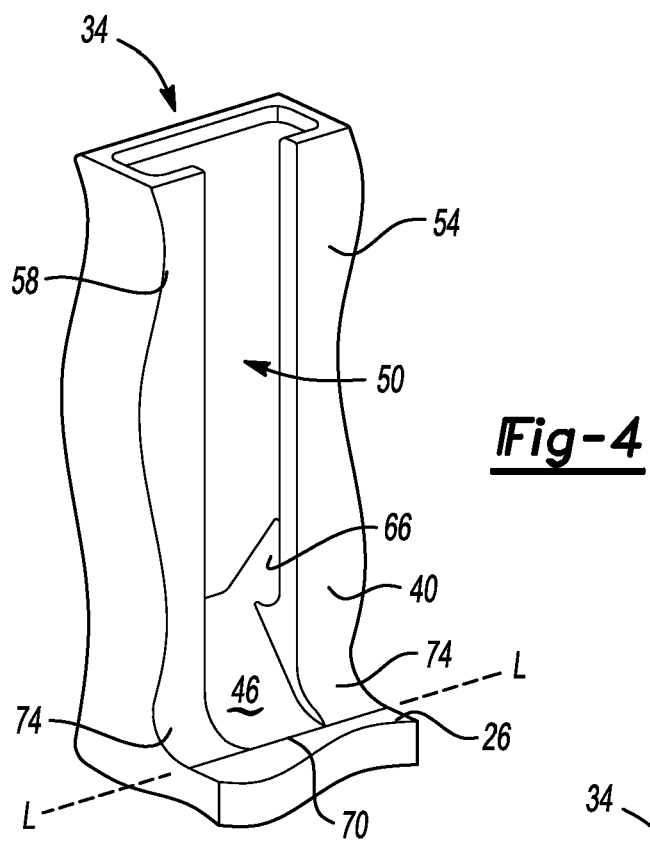
FIG. 4 is an illustration of an alternate embodiment of the retaining pocket shown in FIG. 2.

Referring now to FIG. 4, in another embodiment, the front edge 70 of the canted pocket bottom surface 46 adjoins the cargo enclosure bottom surface 26 at a location substantially collinear with a junction line L where an exterior surface 74 of the cargo enclosure side panel 18 adjoins the cargo enclosure bottom surface 26.

Figure 5:
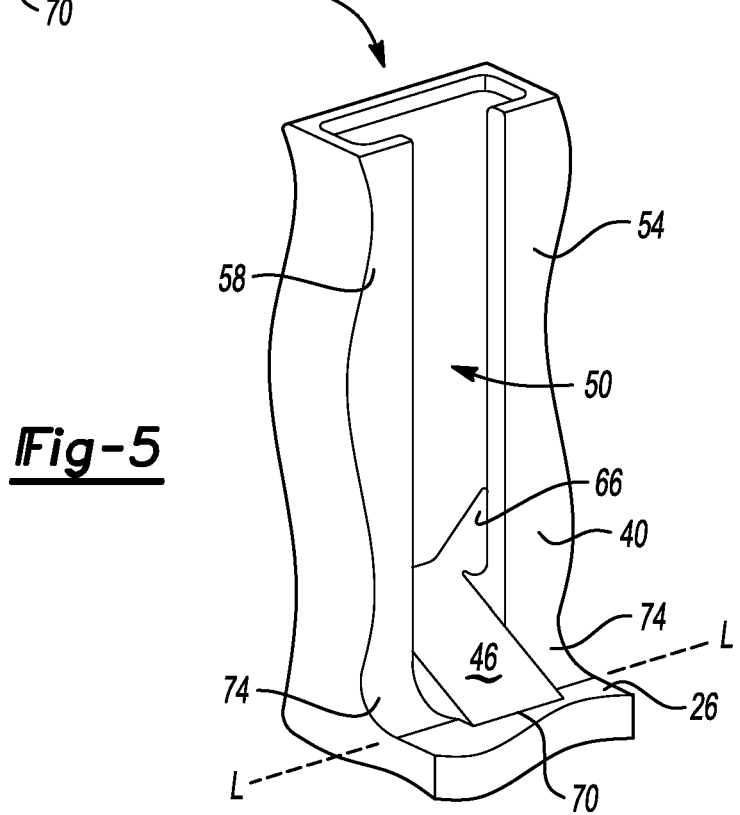
FIG. 5 is an illustration of another alternate embodiment of the retaining pocket shown in FIG. 2.

Referring now to FIG. 5, in yet another embodiment, the front edge 70 of the canted pocket bottom surface 46 adjoins the cargo enclosure bottom surface 26 at a location beyond the junction line L.

Thus, the vehicle utility cargo enclosure 10 of the present invention includes the pockets 34 that are adapted to resist collecting or accumulating debris or other materials. More specifically, the canted bottom surface 46 and/or the canted side wall bottom portions 66 of each pocket 34 are canted such that gravity will cause most, or substantially all, debris or other material that infiltrate the pockets 34 to slide down the canted surfaces 46 and/or 66 and then be disposed onto the cargo enclosure bottom surface 26.

The description of the invention is merely exemplary in nature and, thus, variations that do not depart from the gist of the invention are intended to be within the scope of the invention. Such variations are not to be regarded as a departure from the spirit and scope of the invention

What is claimed is:

1. A vehicle cargo enclosure, said cargo enclosure comprising opposing side panels, each side panel including at least one pocket having a bottom surface canted from a back wall of the pocket downwardly toward an aperture in a front wall and having opposing sidewalls that each include a substantially vertical upper portion and a bottom portion canted from the respective upper portions downwardly toward the opposing sidewall.

2. The cargo enclosure of claim 1, wherein the cargo enclosure comprises a utility bed.

3. The cargo enclosure of claim 1, wherein the pocket is configured to retain a cargo enclosure divider within the aperture.

4. The cargo enclosure of claim 1, wherein the pocket is configured to retain a cargo enclosure side rail stake within an interior portion of the pocket and retain a cargo enclosure divider within the aperture.

5. The cargo enclosure of claim 1, wherein the canted bottom surface is canted at an angle sufficient to cause any small material that infiltrates the pocket to readily slide down the canted bottom surface, through the aperture and onto a bottom surface of the cargo enclosure.

6. The cargo enclosure of claim 1, wherein the canted bottom surface is canted at an angle approximately between 30° and 75° relative to a bottom surface of the cargo enclosure.

7. A vehicle cargo enclosure, said cargo enclosure comprising:
   a side panel including at least one pocket, the pocket comprising:
      a back wall;
      a pair of opposing side walls adjoined to the back wall;
      a front wall adjoining the side walls, the front wall including an elongated opening for retaining a cargo enclosure divider; and
      a canted bottom surface adjoining each of the back wall, the side walls and the front wall;
   wherein a front edge of the canted bottom surface adjoins a bottom surface of the cargo enclosure at a location beyond a junction line where an exterior surface of the cargo enclosure side panel adjoins a bottom surface of the cargo enclosure.

8. The cargo enclosure of claim 7, wherein the cargo enclosure comprises a utility bed.

9. The cargo enclosure of claim 7, wherein the canted bottom surface is canted downwardly from the back wall toward the elongated opening in the front wall at an angle approximately between 30° and 75° relative to a bottom surface of the cargo enclosure.

10. The cargo enclosure of claim 7, wherein the back wall, the opposing side walls, the front wall and the elongated opening form substantially C-shaped elongated recess adapted to retain and cargo enclosure side rail stake.

11. A method for removing debris from a pocket included in a side panel of a vehicle cargo enclosure, said method comprising:
   forming a vehicle cargo enclosure to include at least one pocket in a side panel of the cargo enclosure for retaining at least one of a cargo enclosure divider and a cargo enclosure side rail stake;
   forming a bottom surface of the pocket such that the pocket bottom surface is canted from a back wall of the pocket downwardly toward an aperture in a front wall of the pocket so that debris that infiltrates the pocket will readily slide down the canted pocket bottom surface, through the aperture and onto a bottom surface of the cargo enclosure; and
   forming opposing side walls of the pocket to include a substantially vertical upper portion and a bottom portion canted downwardly from the respective side wall upper portion toward the opposing side wall.

12. The method of claim 11, wherein forming the bottom surface comprises forming the bottom surface to be canted at angle approximately between 30° and 75° relative to the cargo enclosure bottom surface.

13. A cargo enclosure for a vehicle, said cargo enclosure comprising:
   a side panel including at least one pocket, the pocket comprising:
      a back wall;
      a pair of opposing side walls adjoining the back wall, each side wall having a substantially vertical upper portion and a bottom portion canted downwardly from the respective side wall upper portion toward the opposing side wall;
      a first front partition adjoining one of the side walls and a second front partition adjoining the opposing side wall, the first and second front partitions having a space therebetween such that the back wall, the side walls and the first and second front partitions form a substantially C-shaped elongated recess; and
      a bottom surface adjoining each of the back wall, the side walls and the first and second front partitions, the bottom surface canted downwardly from the back wall toward the space between the first and second front partitions.

14. The cargo enclosure of claim 13, wherein the canted bottom surface is canted at an angle approximately between 30° and 75° relative to a bottom surface of the cargo enclosure.

15. The cargo enclosure of claim 13, wherein the canted bottom surface is canted at an angle approximately between 45° and 60° relative to a bottom surface of the cargo enclosure.

16. The cargo enclosure of claim 13, wherein a front edge of the canted bottom surface adjoins a bottom surface of the cargo enclosure at a location within the space between the first and second front partitions.

17. The cargo enclosure of claim 13, wherein a front edge of the canted bottom surface adjoins a bottom surface of the cargo enclosure at a location substantially collinear with a junction line where an exterior surface of the cargo enclosure side panel adjoins a bottom surface of the cargo enclosure.

18. The cargo enclosure of claim 13, wherein a front edge of the canted bottom surface adjoins a bottom surface of the cargo enclosure at a location beyond a junction line where an exterior surface of the cargo enclosure side panel adjoins a bottom surface of the cargo enclosure.

19. A vehicle cargo enclosure, said cargo enclosure comprising:
   a side panel including at least one pocket, the pocket comprising:
      a back wall;
      a pair of opposing side walls adjoined to the back wall;
      a front wall adjoining the side walls, the front wall including an elongated opening for retaining a cargo enclosure divider; and
      a canted bottom surface adjoining each of the back wall, the side walls and the front wall;
   wherein each of the opposing side walls include a substantially vertical upper portion and a bottom portion canted from the respective side wall upper portion downwardly toward the opposing side wall.

20. The cargo enclosure of claim 19, wherein a front edge of the canted bottom surface adjoins a bottom surface of the cargo enclosure at a location within the elongated opening.

21. The cargo enclosure of claim 19, wherein a front edge of the canted bottom surface adjoins a bottom surface of the cargo enclosure at a location substantially collinear with a junction line where an exterior surface of the cargo enclosure side panel adjoins a bottom surface of the cargo enclosure.

22. The cargo enclosure of claim 19, wherein a front edge of the canted bottom surface adjoins a bottom surface of the cargo enclosure at a location beyond a junction line where an exterior surface of the cargo enclosure side panel adjoins a bottom surface of the cargo enclosure.

* * * * *

UNITED STATES PATENT AND TRADEMARK OFFICE
CERTIFICATE OF CORRECTION

| | | |
|---|---|---|
| PATENT NO. | : 7,229,115 B2 | Page 1 of 1 |
| APPLICATION NO. | : 11/147030 | |
| DATED | : June 12, 2007 | |
| INVENTOR(S) | : Matthew D. Wilson et al. | |

It is certified that error appears in the above-identified patent and that said Letters Patent is hereby corrected as shown below:

Column 5, line 50, claim 10, insert --a-- after "elongated opening form"
Column 6, line 5, claim 12, insert --an-- after "canted at"

Signed and Sealed this

Eighteenth Day of March, 2008

JON W. DUDAS
*Director of the United States Patent and Trademark Office*